(12) United States Patent
Deubzer et al.

(10) Patent No.: US 6,251,313 B1
(45) Date of Patent: Jun. 26, 2001

(54) PROCESS FOR THE PREPARATION OF MICROENCAPSULATED PRODUCTS HAVING ORGANOPOLYSILOXANE WALLS

(75) Inventors: Bernward Deubzer; Jochen Dauth, both of Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/261,401

(22) Filed: Mar. 3, 1999

(30) Foreign Application Priority Data

Mar. 12, 1998 (DE) .............................................. 198 10 803

(51) Int. Cl.$^7$ ....................................................... B01J 13/02
(52) U.S. Cl. ........................... 264/4.1; 264/4.7; 428/329; 428/402; 424/400; 424/405; 424/408
(58) Field of Search ..................... 264/4.7, 4.1; 428/329, 428/402; 424/405, 400, 408

(56) References Cited

U.S. PATENT DOCUMENTS

| | | | |
|---|---|---|---|
| 4,169,069 | 9/1979 | Unger et al. | 252/316 |
| 4,370,160 | 1/1983 | Ziemelis | 71/117 |
| 4,486,471 | * 12/1984 | Samejima et al. | 427/213.3 |
| 4,931,362 | 6/1990 | Zsifkovits et al. | 428/402.22 |
| 4,980,392 | 12/1990 | Yamamoto | 523/102 |
| 5,015,691 | * 5/1991 | Lewis et al. | 525/100 |
| 5,128,204 | 7/1992 | Charmot | 428/402 |
| 5,254,656 | 10/1993 | Bilgrien et al. | 528/15 |
| 5,773,407 | 6/1998 | Lai et al. | 510/466 |

FOREIGN PATENT DOCUMENTS

| | | |
|---|---|---|
| 1 962 039 | 10/1970 | (DE) . |
| 197 41 581 A1 | 4/1998 | (DE) . |
| 0 304 416 A1 | 8/1988 | (EP) . |
| 0 436 449 A1 | 12/1990 | (EP) . |

OTHER PUBLICATIONS

Derwent Abstract Corresponding To DE 1962039 A (AN 1970–72338R).

* cited by examiner

*Primary Examiner*—P. Hampton-Hightower
(74) *Attorney, Agent, or Firm*—Brooks & Kushman P.C.

(57) ABSTRACT

In the preparation of microcapsules having shell walls of organopolysiloxane and a core material, the shell walls are produced in situ by hydrolysis and polycondensation of organosilanes and/or their condensates having not more than 4 silicon atoms.

19 Claims, No Drawings

PROCESS FOR THE PREPARATION OF MICROENCAPSULATED PRODUCTS HAVING ORGANOPOLYSILOXANE WALLS

TECHNICAL FIELD

The invention relates to a process for the preparation of microcapsules having shell walls of organopolysiloxane.

BACKGROUND ART

The use of organopolysiloxanes as microcapsule shell wall materials, and processes for their preparation are known. A common feature of all the processes heretofore described, is that the shell walls are formed from already prepared organopolysiloxanes.

The use of solid, thermoplastic organosiloxane polymers for shell walls is described, for example, in U.S. Pat. No. 5,254,656. The organosiloxane polymers must be dissolved in suitable solvents, the solution added under exactly controlled conditions to the material to be encapsulated, and the solvent removed again by a complicated procedure.

The use of liquid organosiloxane polymers for shell walls is described, for example, in U.S. Pat. No. 4,370,160. The liquid organosiloxane polymers must then be converted into the solid state by a separate hardening step.

These known processes for the microencapsulation of organopolysiloxanes require expensive raw materials and are technologically complicated, and thus hinder the practical use of organopolysiloxanes as shell materials in microencapsulation, although organopolysiloxanes are of considerable interest owing to their wide variation and unusual properties.

SUMMARY OF THE INVENTION

It is therefore an object of the present invention to provide a process which makes it possible to produce shell walls of organopolysiloxanes in a simple manner and from easily obtainable raw materials.

DESCRIPTION OF THE PREFERRED EMBODIMENTS

The invention relates to a process for the preparation of microcapsules having shell walls of organopolysiloxane surrounding a core material, in which the shell walls are produced in situ by hydrolysis and polycondensation of organosilanes and/or their condensates having not more than 4 silicon atoms.

The organosilanes used in the process preferably have the general formulae Ia to Id $$R^1{}_2R^2SiX \quad (Ia),$$

$$R^1R^2SiX_2 \quad (Ib),$$

$$R^2WiX_3 \quad (Ic),$$

$$SiX_4 \quad (Id),$$

$$X_3Si—R^3—SiX_3 \quad (Ie),$$

in which $R^1$ denotes a monovalent, optionally halogen-substituted $C_{1-18}$ hydrocarbon radical which is optionally interrupted by ether oxygen atoms or a hydrogen atom, $R^2$ has the meaning of $R^1$ or represents a monovalent $C_{1-12}$ hydrocarbon radical which may be interrupted by one or more groups of the formulae —NR$^1$—, —S—, —O— or —CO—O— and which may be substituted by one or more groups of the formulae —SH, —OH, —NR$^1{}_2$, —Cl, —COOH,

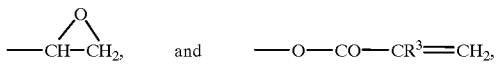

$R^3$ is a divalent alkyl radical having 1 to 6 carbon atoms or is the phenylene group and X denotes a group —OR$^4$, an acetoxy, amino, acid amide or oximino group or a chlorine atom, $R^4$ denotes a hydrogen atom or a $C_{1-18}$ alkyl radical, which may be interrupted by ether oxygen atoms.

Examples of radicals $R^1$ are alkyl radicals such as the methyl, ethyl, n-propyl, isopropyl, 1-n-butyl, 2-n-butyl, isobutyl, tert-butyl, n-pentyl, isopentyl, neopentyl or tert-pentyl radicals; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl and cycloheptyl radicals and methylcyclohexyl radicals; aryl radicals such as phenyl, naphthyl and anthryl and phenanthryl radicals; alkaryl radicals such as o-, m- and p-tolyl radicals, xylyl radicals, and ethylphenyl radicals; and aralkyl radicals, such as the benzyl radical and the α- and the β-phenylethyl radicals.

The alkyl radicals having 1 to 10, in particular up to 6 carbon atoms are preferred, in particular the methyl and ethyl radicals. Examples of alkyl radicals $R^1$ which are substituted by an ether oxygen atom are the methoxyethyl and ethoxyethyl radicals.

Examples of halogenated radicals $R^1$ are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Examples of aliphatically unsaturated radicals $R^1$ are alkenyl radicals, such as the vinyl, 5-hexenyl, 2,4-divinylcyclohexylethyl, 2-propenyl, allyl, 3-butenyl and 4-pentenyl radical; and alkynyl radicals, such as the ethynyl, propargyl and 2-propynyl radical.

Preferred radicals $R^2$ are radicals of the formulae

—(CH$_2$)$_m$—SH,

—(CH$_2$)$_m$—OH,

—(CH$_2$)$_m$—Cl,

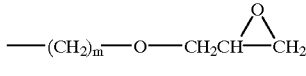

—(CH$_2$)$_n$—COOH,

—(CH$_2$)$_m$-NH(C$_6$H$_{11}$)

—(CH$_2$)$_m$—NH$_2$,

—(CH$_2$)$_m$-NH(CH$_3$),

—(CH$_2$)$_m$—NH(CH$_2$)$_m$NH$_2$,

—(CH$_2$)$_m$—O—(CH$_2$)$_m$—CH$_3$,

—$(CH_2)_m$—[O—$(CH_2)_n$]$_m$—O—(CH=CH$_2$)

—$(CH_2)_m$—O—CO—CH=CH$_2$, where m denotes the values 1, 2, 3, 4, 5 or 6 and
n denotes the values 1 to 18, in particular 6 to 12.

On average, X has at least the value 2.05, preferably at least 2.1, in particular at least 2.3, calculated per molecule of organosilane of the general formulae Ia to Ie.

The organosilane composition is preferably chosen so that the organopolysiloxane formed as the shell wall corresponds to the general formula II $$[R^1{}_2R^2SiO_{1/2}]_x[R^1R^2SiO_{2/2}]_y[R^2SiO_{3/2}]_z[SiO_{4/2}]_u[SiO_{3/2}—R^3—SiO_{3/2}]_v \quad (II),$$

in which
x denotes 0 to 60 mol %,
y denotes 0 to 95 mol %,
z denotes 0 to 100 mol %,
u denotes 0 to 50 mol % and
v denotes 0 to 100 mol % and
$R^1$, $R^2$ and $R^3$ have the abovementioned meanings.

Preferably,
x denotes 0 to 30 mol %,
y denotes 0 to 50 mol %,
z denotes 50 to 100 mol %,
u denotes 0 to 20 mol % and
v denotes 0 to 50 mol %.

The process steps required for producing the shell walls of organopolysiloxanes depend on whether the core material to be encapsulated is water-insoluble or water-soluble.

(A) In the case of water-insoluble, liquid or solid core material to be encapsulated, the organosilanes and/or their condensates are added to an aqueous emulsion, dispersion or suspension of the core material with thorough mixing.

(B) However, the core material to be encapsulated can also be dissolved or dispersed in the organosilanes and/or their condensates and the solution or dispersion mixed into an aqueous phase which optionally contains emulsifier or suspending agent.

In both variants, it is preferable to work with such a large excess of water that the microcapsules formed after production of the shell walls from organosilanes and/or their condensates by hydrolysis and condensation of organosilanes and/or their condensates are present as a dispersion or suspension in the aqueous phase and can be further processed.

(C) In the case of a water-soluble, liquid or solid core material or if water itself is to be microencapsulated, the water-soluble, liquid or solid core material is dissolved in the desired amount of water and the solution or the water itself is dispersed or suspended in a liquid phase which is immiscible with water but miscible with organosilanes and/or their condensates and which optionally contains dispersants or suspending agents.

After the addition of the organosilanes and/or their condensates, the shell walls form. The water-immiscible liquid phase must be chosen so that it is miscible with the organosilanes and/or their condensates but does not act as a solvent for the organopolysiloxane shell walls formed.

For example, solvents customarily used in industry, such as aliphatics, aromatics, esters and alcohols, ketones and ethers, are suitable, provided that they are not water-miscible. Preferably, the solvents have a solubility of less than 1% by weight in water at 20° C. Preferred solvents are hexane, n-heptane, naphtha fractions, toluene and xylene. Furthermore, water must be present in an amount sufficient to enable the hydrolysis to take place. The microcapsules formed are present in the nonaqueous phase and can be further processed therefrom.

Depending on the molecular weight and the established ratio of the indices u, v, x, y and z, the capsule shell wall according to the invention is a highly viscous to solid substance which is soluble neither in the aqueous (variants (A) and (B)) or water-immiscible liquid phase (variant (C)) nor in the capsule core. Hydrolysis and polycondensation can take place without addition of hydrolysis and/or condensation catalysts, but such catalysts are preferably added.

The catalysts may be acidic or basic, basic catalysts preferably being used.

Examples of basic hydrolysis and condensation catalysts are aminosilanes, compounds liberating ammonia as a result of hydrolysis, such as divinyltetramethyldisilazane, hexamethyldisilazane, organic amine compounds, such as n-hexylamine, triethylamine, diethylamine, tributylamine, piperidine and diazabicyclooctane, organic hydroxides, in particular quaternary hydrocarbon ammonium hydroxides, such as tetramethylammonium hydroxide, tetrabutylammonium hydroxide and trimethylbenzylammonium hydroxide, and inorganic hydroxides, such as sodium hydroxide, lithium hydroxide and potassium hydroxide, and a mixture of the abovementioned compounds.

Particularly preferred basic catalysts are the aminosilanes of the general formula III $$X_aSi—[R^6{}_b—NR^5]_c—R^6—N(R^5)_2 \quad (III)$$

in which
$R^5$ denotes a hydrogen atom or an alkyl radical having 1 to 8 carbon atoms per radical,
$R^6$ denotes a divalent alkyl radical having 1 to 6 carbon atoms,
a denotes the values 1, 2 or 3,
b denotes the values 1, 2, 3 or 4 and
c denotes the values 0, 1, 2 or 3 and
X has the above meanings.

The aminosilanes of the general formula m1 are incorporated in the organopolysiloxane forming the shell wall. Consequently, the polarity of the organopolysiloxanes forming the shell wall can be influenced.

X preferably denotes methoxy or alkoxy radicals.

Preferred examples of aminosilanes of the general formula III are aminopropyltrimethoxysilane, aminoethylaminopropyltrimethoxysilane and N-cyclohexylaminopropyltrimethoxysilane.

In the hydrolysis and condensation, the catalyst is preferably used in amounts of 0.1 to 30% by weight, based on the weight of the organosilanes and/or their condensates of the general formulae Ia to Ie. The basic catalysts can be added to the organosilanes and/or to their condensates or to the aqueous phase (variants (A) and (B)) or water-immiscible liquid phase (variant (C)).

The radicals $R^1$, $R^2$, $R^3$, $R^4$, $R^5$ and $R^6$ and the indices a, b, c, m, n, u, v, x, y and z can, independently of one another, be identical or different in each case in the above formulae.

Examples of emulsifiers which may optionally be added are commercially available and thoroughly investigated surfactants, such as, for example, sorbitan esters of fatty acids having 10 to 22 carbon atoms; polyoxyethylene sorbitan esters of fatty acids having 10 to 22 carbon atoms and an ethylene oxide content of up to 35 percent; polyoxyethyl sorbitol esters of fatty acids having 10 to 22 carbon atoms; polyoxyethylene derivatives of phenols having 6 to 20 carbon atoms in the aromatic and an ethylene oxide content of up to 95 percent; fatty amino- and amidobetaines having 10 to 22 carbon atoms; polyoxyethylene condensates of fatty acids or fatty alcohols having 10 to 22 carbon atoms and an ethylene oxide content of up to 95 percent; ionic surfactants, such as alkylarylsulfonates having 6 to 20 carbon atoms in the alkyl group; fatty acid soaps having 10 to 22 carbon atoms; fatty sulfates having 10 to 22 carbon atoms; allesulfonates having 10 to 22 carbon atoms, alkali metal salts of dialkylsulfosuccinates; fatty amino-oxides having 10 to 22 carbon atoms; fatty imidazolines having 6 to 20 carbon atoms; fatty amidosulfobetaines having 10 to 22 carbon atoms; quaternary surfactants, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 percent of ethylene oxide; ethylene oxide condensates of fatty acid monoesters of glycerol having 10 to 22 carbon atoms and up to 95 percent of ethylene oxide; mono- or diethanolamides of fatty acids having 10 to 22 carbon atoms; alkoxylated silicone surfactants containing ethylene oxide and/or propylene oxide units; and phosphate esters.

As is well known in the area of surfactants, the opposite ions in the case of anionic surfactants may be alkali metals, ammonia or substituted amines, such as trimethylamine or triethanolamine. Usually, ammonium, sodium and potassium ions are preferred. In the case of cationic surfactants, the opposite ion is a halide, sulfate or methylsulfate. Chlorides are the generally industrially available compounds.

The abovementioned fatty structures usually represent the lipophilic half of surfactants. A customary fatty group is an alkyl group of natural or synthetic origin. Known unsaturated groups are the oleyl, linoleyl, decenyl, hexadecenyl and dodecenyl radicals. Alkyl groups may be cyclic, linear or branched.

Other possible surfactants are sorbitol monolaurate/ethylene oxide condensates; sorbitol monomyristate/ethylene oxide condensates; sorbitol monostearate/ethylene oxide condensates; dodecylphenoll ethylene oxide condensates; myristylphenol/ethylene oxide condensates; octylphenol/ethylene oxide condensates; stearylphenol/ethylene oxide condensates; lauryl alcohol/ethylene oxide condensates; stearyl alcohol/ethylene oxide condensates; decylaminobetaine; cocoamidosulfobetaine; oleylamidobetaine; cocoimidazoline; n-cocomorpholine oxide; decyldimethylamine oxide; cocoamidodimethylamine oxide; sorbitan tristearate having condensed ethylene oxide groups; sorbitan trioleate having condensed ethylene oxide groups, sodium dodecylsulfate or potassium dodecylsulfate; sodium stearylsulfonate or potassium stearylsulfonate; triethanolamine salt of dodecylsulfate; trimethyldodecylammonium chloride; trimethylstearylammonium methosulfate; sodium laurate; sodium myristate or potassium myristate.

Other possible protective colloids are partially hydrolyzed polyvinyl alcohols.

The component may comprise one of the abovementioned surfactants or a mixture of two or more of the abovementioned surfactants.

Examples of suspending agents which may optionally be added are gelatin, agar, pectins, alginates, methylcellulose, polyvinylpyrrolidone, alumina, bentonites, kieselguhr, calcium phosphates and barium sulfate.

The microcapsules preferably have a core material/shell wall ratio of from 0.3 to 4.0, in particular from 1.0 to 3.0, based in each case by weight.

In the process, the weight ratio of shell wall and capsule core to the aqueous phase (variants (A) and (B)) or water-immiscible liquid phase (variant (C)) is from 0.05 to 0.6, preferably from 0.1 to 0.4.

The microcapsules may have a size of 0.5 $\mu$m to 1000 $\mu$m.

The microcapsule shell walls may also have residual alkoxy or hydroxy functionality of 0.1 to 20% by weight.

The encapsulation is preferably carried out at a temperature of preferably, 10° C. to 100° C., more preferably 25° C. to 80° C., and preferably at a pressure of 900 to 2000 hPa. However, it is also possible to use higher or lower pressures. Preferably, the microcapsules are isolated by known technologies as filtration, centrifugation is spray-drying and are dried to give powders.

The alcohol formed in the hydrolysis is preferably removed during the working-up. The microcapsule shell walls may have properties such that they are permeable, semipermeable or impermeable.

Moreover, the microcapsules may be used for all applications in which microcapsules have also been used to date. The microcapsules may be used, for example, for the treatment of sheet-like textile structures, such as woven fabrics, knitted fabrics or nonwovens. The invention furthermore relates to textile fiber preparation and leather treatment. Furthermore, the microcapsules according to the invention may be used in the cosmetics, care product, adhesives, polish, coatings, paper and construction industries. They are also used as antifoams and for compatibilizing organosilicon compounds and organic polymers.

Unless stated otherwise in each case, in the following Examples
a) all stated amounts are based on weight;
b) all pressures are 1000 hPa (abs.);
c) all temperatures are 20° C.

EXAMPLES

Example 1

(Variant (A))

61 g of a commercial, nonionically stabilized emulsion CT 94 E (Wacker-Chemie GmbH, Munich) containing 33 g of a liquid trimethylsilyl-terminated dimethylpolysiloxane are diluted with 182 g of water. A mixture of 30 g of methyltrimethoxysilane and 2.4 g of aminoethylaminopropyltrimethoxysilane is added while stirring (400 rpm with magnetic stirrer). Stirring is continued for three hours and the product is filtered off over a filter. The filter cake is dried for 5 days at room temperature. 32 g (65% of theory) of a free-flowing, white, fine-particled powder which releases the oily content under pressure are obtained.

Example 2

(Variant (A))

The procedure of Example 1 is repeated. However, a mixture of 27 g of methyltrimethoxysilane and 3.3 g of hexamethyldisilaaane is added. Yield is 19 g (38% of theory) of a free-flowing white powder.

Example 3

(Variant (A))

The procedure of Example 1 is repeated. However, a mixture of 34 g of methyltrimethoxysilane and 1.7 g of n-hexylamine is added. Yield is 40 g (79% of theory) of a free-flowing white powder.

Example 4

(Variant (A))

The procedure of Example 1 is repeated. However, a mixture of 27 g of methyltrimethoxysilane and 0.2 g of lithium hydroxide hydrate and 0.2 g of ethylenediamine is added. Yield is 29 g (61% of theory) of a free-flowing white powder.

Example 5
(Variant (B))

33 g of a trimethylsilyl-terminated polydimethylsiloxane having a viscosity of 5000 mm²/s (silicone oil AK 5000, Wackerlbeie GmbH, Munich) are dissolved in 30 g of methyltrimethoxysilane and 2.4 g of aminoethylaminopropyltrimethoxysilane and the solution is added to 182 g of water with thorough stirring (Ultra-Turrax® stirrer from Janke & Kunkel GmbH & Co KG) at 9500 rpm and is stirred for a half hour. After working up as described in Example 1, 36 g (71% of theory) of a free-flowing white powder are obtained.

Example 6
(Variant (C))

19 g of water are dispersed in 171 g of n-hexane with the aid of an Ultra-Turrax® at 9500 rpm. 17 g of methyltrimethoxysilane and 1.4 g of aminoethylaminopropyltrimethoxysilane are added to this dispersion while stirring. After working up according to Example 1, 7 g (24% of theory) of a white powder are obtained.

Example 7
(Variant (A))

400 g of a styrene acrylate dispersion having a solids content of 50% (Acronal® 290 D from BASF, Ludwigshafen) are diluted with 1600 g of water. A mixture of 365 g of methyltrimethoxysilane and 29 g of aminoethylaminopropyltrimethoxysilane is added with thorough stirring (magnetic stirrer at 400 rpm) and stirring is continued for a further three hours. After working up according to Example 1, 363 g (61% of theory) of a free-flowing white powder are obtained.

Example 8
(Variant (A))

33 g of a commercial liquid paraffin having a viscosity of 111 mm²/s at 25° C. and a density of 0.88 g/cm³ (from Merck, Darmstadt) are dispersed in 215 g of water with the aid of an Ultra-Turrax® mixer at 9500 rpm. Thereafter, a mixture of 30.4 g (223 mmol) of methyltrimethoxysilane and 2.4 g (11 mmol) of aminoethylaminopropyltrimethoxysilane is added and stirring is continued for half an hour. After working up according to Example 1, 27.7 g (55.4% of theory) of a free-flowing fine-particled powder are obtained.

Example 9
(Variant (A))

300 g of isooctyltriethoxysilane (Silan BS 1701, Wacker-Chemie GmbH, Munich) are dispersed in 3600 g of water with the aid of an Ultra-Turrax® at 9500 rpm. A mixture of 411 g of methyltrimethoxysilane and 33 g of aminoethylaminopropyltrimethoxysilane is added while stirring, and stirring is continued for half an hour. After working up according to Example 1, 457 g (87% of theory) of a free-flowing white powder are obtained.

What is claimed is:

1. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase, wherein also present is a disilazane or an aminosilane.

2. The process of claim 1, in which the organosilanes have the general formulae Ia to Id:

 (Ia),

 (Ib),

 (Ic),

 (Id), or is a compound of the formula (Ie):

 (Ie), in which $R^1$ denotes a monovalent, optionally halogen-substituted $C_{1-18}$ hydrocarbon radical which is optionally interrupted by ether oxygen atoms or a hydrogen atom;

$R^2$ has the meaning of $R^1$ or represents a monovalent $C_{1-18}$ hydrocarbon radicals optionally interrupted by one or more groups of the formulae —$NR^4$—, —S—, —O— and —CO—O—, and optionally substituted by one or more groups of the formulae —SH, —OH, —$NR^4{}_2$, —Cl, —COOH,

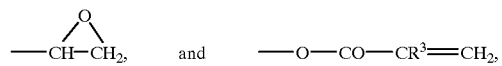

$R^3$ is a divalent $C_{1-6}$ alkyl radical or the phenylene group;

$R^4$ denotes a hydrogen atom or a $C_{1-18}$ alkyl radical optionally interrupted by ether oxygen atoms; and X denotes a group —$OR^4$, an acetoxy, amino, acid amide, oximino group, or a chlorine atom.

3. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase, in which the organosilanes have the general formulae Ia to Id:

 (Ia),

 (Ib),

 (Ic),

 (Id), or is a compound of the formula (Ie):

 (Ie), in which $R^1$ denotes a monovalent, optionally halogen-substituted $C_{1-18}$ hydrocarbon radical which is optionally interrupted by ether oxygen atoms or a hydrogen atom;

$R^2$ has the meaning of $R^1$ or represents a monovalent $C_{1-18}$ hydrocarbon radical, optionally interrupted by one or more groups of the formulae —$NR^4$—, —S—, —O— and —CO—O—, and optionally substituted by one or more groups of the formulae —SH, —OH, —$NR^4{}_2$, —Cl, —COOH,

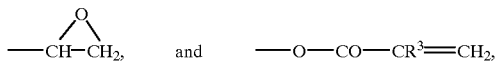

R³ is a divalent $C_{1-6}$ alkyl radical or the phenylene group;

R⁴ denotes a hydrogen atom or a $C_{1-18}$ alkyl radical optionally interrupted by ether oxygen atoms; and X denotes a group —OR⁴, an acetoxy, amino, acid amide, oximino group, or a chlorine atom in which X on average is at least 2.05.

4. The process as claimed in claim 1, in which the liquid or solid core material to be encapsulated is water-insoluble and the organosilanes and/or their condensates are added to an aqueous emulsion, dispersion or suspension of the core material with thorough mixing.

5. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase, in which the organosilanes have the general formulae Ia to Id:

or is a compound of the formula (Ie):

in which

R¹ denotes a monovalent, optionally halogen-substituted $C_{1-18}$ hydrocarbon radical which is optionally interrupted by ether oxygen atoms or a hydrogen atom;

R² has the meaning of R¹ or represents a monovalent $C_{1-18}$ hydrocarbon radical, optionally interrupted by one or more groups of the formulae —NR₄—, —S—, —O— and —CO—O—, and optionally substituted by one or more groups of the formulae —SH, —OH, —NR⁴₂, —Cl, —COOH,

R³ is a divalent $C_{1-6}$ alkyl radical or the phenylene group;

R⁴ denotes a hydrogen atom or a $C_{1-18}$ alkyl radical optionally interrupted by ether oxygen atoms; and X denotes a group —OR⁴, an acetoxy, amino, acid amide, oximino group, or a chlorine atom, in which the liquid or solid core material to be encapsulated is water-insoluble and the organosilanes and/or their condensates are added to an aqueous emulsion, dispersion or suspension of the core material with thorough mixing.

6. The process as claimed in claim 5, in which X on average is at least 2.05.

7. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase in which the liquid or solid core material to be encapsulated is dissolved or dispersed in the organosilanes and/or their condensates, and the solution or dispersion thus formed is mixed into an aqueous phase which optionally contains one or more emulsifiers and/or suspending agents.

8. The process as claimed in claim 7, in which the organosilanes have the general formulae Ia to Id:

or is a compound of the formula (Ie):

in which

R¹ denotes a monovalent, optionally halogen-substituted $C_{1-18}$ hydrocarbon radical which is optionally interrupted by ether oxygen atoms or a hydrogen atom;

R² has the meaning of R¹ or represents a monovalent $C_{1-18}$ hydrocarbon radical, optionally interrupted by one or more groups of the formulae —NR⁴—, —S—, —O— and —CO—O—, and optionally substituted by one or more groups of the formulae —SH, —OH, —NR⁴₂, —Cl, —COOH,

R³ is a divalent $C_{1-6}$ alkyl radical or the phenylene group;

R⁴ denotes a hydrogen atom or a $C_{1-18}$ alkyl radical optionally interrupted by ether oxygen atoms; and X denotes a group —OR⁴, an acetoxy, amino, acid amide, oximino group, or a chlorine atom.

9. The process as claimed in claim 7, in which X on average is at least 2.05.

10. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase in which the liquid or solid core material to be encapsulated is water-soluble, the water-soluble, liquid or solid core material is dissolved in the desired amount of water and the resulting solution is dispersed or suspended in a liquid phase which is immiscible with water but is miscible with organosilanes and/or their condensates and which optionally contains dispersants or suspending agents.

11. The process as claimed in claim 7, in which the organosilanes have the general formulae Ia to Id:

$$R^1{}_2R^2SiX \quad (Ia),$$

$$R^1{}_2R^2SiX_2 \quad (Ib),$$

$$R^2SX_3 \quad (Ic),$$

$$SiX_4 \quad (Id),$$

or is a compound of the formula (Ie):

$$X_3Si\text{—}R^3\text{—}SiX_3 \quad (Ie),$$

in which $R^1$ denotes a monovalent, optionally halogen-substituted $C_{1-18}$ hydrocarbon radical which is optionally interrupted by ether oxygen atoms or a hydrogen atom; $R^2$ has the meaning of $R^1$ or represents a monovalent $C_{1-18}$ hydrocarbon radical, optionally interrupted by one or more groups of the formulae —NRW$^4$, —S—, —O— and —CO—O—, and optionally substituted by one or more groups of the formulae —SH, —OH, —NR$^4{}_2$, —Cl, —COOH,

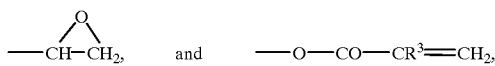

$R^3$ is a divalent $C_{1-6}$ alkyl radical or the phenylene group;

$R^4$ denotes a hydrogen atom or a $C_{1-18}$ alkyl radical optionally interrupted by ether oxygen atoms; and X denotes a group —OR$^4$, an acetoxy, amino, acid amide, oximino group, or a chlorine atom.

12. The process as claimed in claim 7, in which X on average is at least 2.05.

13. A process for the preparation of microcapsules having shell walls of organopolysiloxane surrounding a core material, said process comprising polymerizing, by hydrolysis and polycondensation of organosilanes and/or their condensates having not more than 4 silicon atoms, to produce shell walls of said microcapsules in situ in an at least biphasic liquid system containing said core material in one phase, and said organosilanes and/or their condensates having not more than 4 silicon atoms in the same or a separate phase, at least one phase being an aqueous phase wherein water is to be microencapsulated, comprising dispersing or suspending water in a liquid phase in which water is substantially immiscible, and in which said silanes or their condensation products are miscible, said liquid phase optionally containing dispersants or suspending agents.

14. The process as claimed in claim 7, in which the organosilanes have the general formulae Ia to Id:

$$R^1{}_2R^2SiX \quad (Ia),$$

$$R^1{}_2R^2SiX_2 \quad (Ib),$$

$$R^2SX_3 \quad (Ic),$$

$$SiX_4 \quad (Id),$$

or is a compound of the formula (Ie):

$$X_3Si\text{—}R^3\text{—}SiX_3 \quad (Ie),$$

in which $R^1$ denotes a monovalent, optionally halogen-substituted $C_{1-8}$ hydrocarbon radical which is optionally interrupted by ether oxygen atoms or a hydrogen atom;

$R^2$ has the meaning of $R^1$ or represents a monovalent $C_{1-18}$ hydrocarbon radical, optionally interrupted by one or more groups of the formulae —NR$^4$—, —S—, —O— and —CO—O—, and optionally substituted by one or more groups of the formulae —SH, —OH, —NR$^4{}_2$, —Cl, —COOH,

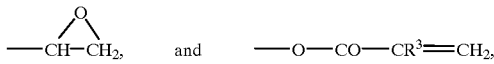

$R^3$ is a divalent $C_{1-6}$ alkyl radical or the phenylene group;

$R^4$ denotes a hydrogen atom or a $C_{1-18}$ alkyl radical optionally interrupted by ether oxygen atoms; and X denotes a group —OR$^4$, an acetoxy, amino, acid amide, oximino group, or a chlorine atom.

15. The process as claimed in claim 7, in which X on average is at least 2.05.

16. The process of claim 1, wherein said aminosilane has the formula $$X_aSi\text{—}\{R^6{}_b\text{—}NR^5\}_c\text{—}R^6\text{—}N(R^5)_2$$

wherein $R^5$ is a hydrogen atom or a $C_{1-18}$ alkyl radical, $R^6$ is a divalent $C_{1-6}$ alkyl radical a is 1, 2, or 3, b is 1, 2, 3, or 4, c is 0, 1, 2, or 3, and x is —OR$^4$, acetoxy, amino, acid amide, oximino, or chloro, and $R^4$ is hydrogen or $C_{1-18}$ alkyl optionally containing interspersed oxygen atoms.

17. A process for the preparation of microcapsules isolatable in dry, free flowing form, and containing a liquid core material, said process comprising polymerizing by hydrolysis and polycondensation of organosilanes and/or their condensates having not more than 4 silicon atoms, to produce shell walls of said microcapsules in situ in a biphasic system one of the phases of which is an aqueous phase, wherein said silane comprises a silane selected from the group consisting of silanes corresponding to the formula $$R^7{}_dSiX_{4-d}$$

where $R^7$ is a $C_{1-6}$ alkyl group, X is a hydrolyzable group selected from OR$^4$, acetoxy, amino, acid amide, oximino or chloro, wherein $R^4$ is H or $C_{1-18}$ alkyl, and d is 1, 2, or 3 optionally, an aminosilane or disilazane; and optionally a basic compound other than an aminosilane or disilazane as a catalyst.

18. The process of claim 17, wherein $R^7$ is methyl.

19. The process of claim 17, wherein $R^7$ is methyl and X is methoxy or ethoxy.

* * * * *

UNITED STATES PATENT AND TRADEMARK OFFICE
CERTIFICATE OF CORRECTION

PATENT NO. : 6,251,313 B1
DATED : June 26, 2001
INVENTOR(S) : Bernward Deubzer et al.

It is certified that error appears in the above-identified patent and that said Letters Patent is hereby corrected as shown below:

Column 10, claim 8,
Line 20, delete "$R^2SX_3$" and insert -- $R^2SiX_3$ --.

Column 11, claim 11,
Line 3, delete "$R^2SX_3$" and insert -- $R^2SiX_3$ --.
Line 17, delete "-$NRW^4$-" and insert -- -$NW^4$- --.

Column 11, claim 14,
Line 55, delete "$R^2SX_3$" and insert -- $R^2SiX_3$ --.

Signed and Sealed this

Fourth Day of December, 2001

Attest:

NICHOLAS P. GODICI
*Attesting Officer*    *Acting Director of the United States Patent and Trademark Office*